United States Patent

Israel

Patent Number: 5,235,356
Date of Patent: Aug. 10, 1993

[54] EYEGLASS HINGE FOR FRAMES

[76] Inventor: Hal G. Israel, 2416 Denfield St., Camden, N.J. 08104

[21] Appl. No.: 789,266

[22] Filed: Nov. 8, 1991

[51] Int. Cl.⁵ .................................................. G02C 5/22
[52] U.S. Cl. ..................................... 351/153; 351/141; 351/121; 16/228
[58] Field of Search ............... 351/141, 153, 140, 121; 16/228

[56] References Cited

U.S. PATENT DOCUMENTS 3,110,057 11/1963 Urich ................................... 351/153
3,594,073 7/1971 Liautaud .............................. 351/153

Primary Examiner—Rodney B. Bovernick
Assistant Examiner—Hung Xuan Dang
Attorney, Agent, or Firm—Zachary T. Wobensmith, III

[57] ABSTRACT

A hinge for an eyeglass frame which hinge is of two piece construction, one half attached to a temple and the other to the lens frame, with a captive screw in one hinge half which engages a portion of the other hinge half to retain the hinge together.

1 Claim, 1 Drawing Sheet

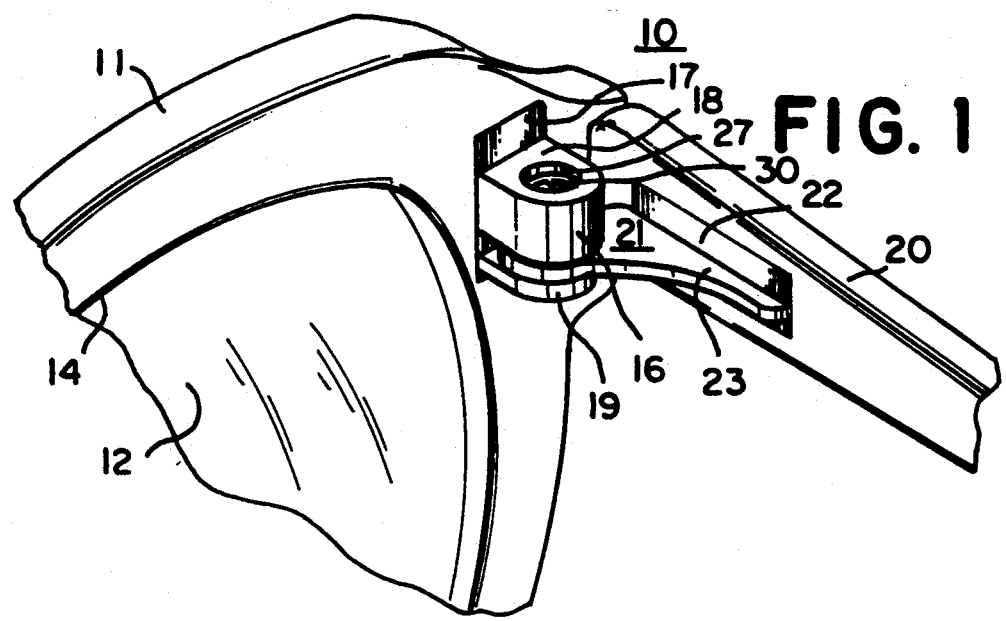
FIG. 1
FIG. 2
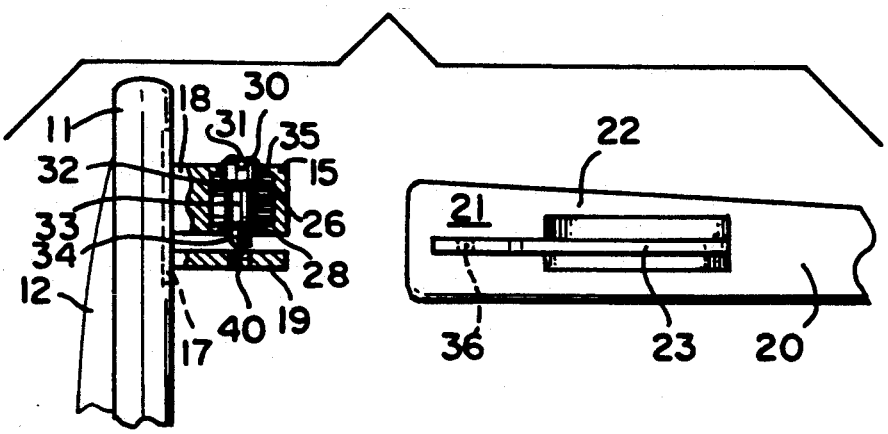
FIG. 3
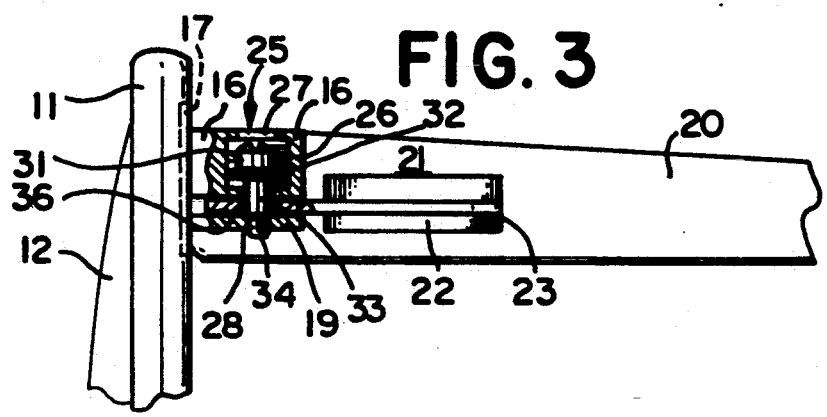

EYEGLASS HINGE FOR FRAMES

BACKGROUND OF THE INVENTION

1. Field of the Invention

A two piece hinge for eyeglass frames that is detachably retained together by a screw that is captive in one of the hinge pieces.

2. Description of the Prior Art

There have been many hinges designed for eyeglasses to connect the temples to the lens frame. Eyeglass hinges are subjected to great abuse due to the concentration of bending forces at the hinge, as well as wear engendered by folding the temples about the hinge for storage of the eye glasses. Many of the hinges in use rely on a screw that is engaged in the top and bottom of one hinge half and in a central portion of the other hinge half. The screws are prone to loosen and fall out causing the temples to detach from the lens frame.

Example of hinge structure are shown in the U.S. Pat. Nos. to Waitt, 1,270,076; Ratti, 2,829,558; Vischer, 3,841,741; Gross, 3,403,958; Liautaud, 3,546,735; Miyamoto, 3,528,728 and Czudak, 2,947,024.

None of the prior art hinges discloses a captive screw structure for an eyeglass hinge as disclosed herein.

The hinge for eyeglass frames does not suffer from the problems of the prior art hinges and provides many positive advantages.

SUMMARY OF THE INVENTION

This invention relates to two piece hinges for eye glass frames, with one hinge half attached to the temple and the other half attached to the lens frame. A captive double thread screw is carried in the lens frame hinge half, and engages the hinge half carried on the temple to form a complete hinge.

The principal object of the invention is to provide a two piece hinge for eyeglass frames that is detachably retained together by a captive screw.

A further object of the invention is to provide a hinge of the character aforesaid that is simple and inexpensive to construct but sturdy and reliable in use.

A further object of the invention is to provide a hinge of the character aforesaid that can be used with a wide variety of eyeglass frames.

A further object of the invention is to provide a hinge of the character aforesaid wherein the temples can be quickly and easily assembled and disassembled from the lens frame.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a view in perspective of the eyeglass hinge of the invention;

FIG. 2 is a side elevational, exploded view in partial section of the disassembled hinge of FIG. 1; and FIG. 3 is a view similar to FIG. 2, but showing the hinge of FIG. 1 in assembled condition.

It should, of course, be understood that the description and drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 3 thereof a portion of an eyeglass frame 10 is therein illustrated. The frame 10 includes a lens frame 11 shown of conventional type and preferably constructed of synthetic plastic of well known type, but which can be of other desired materials. A lens 12, is carried in an exterior periphery portion 14 of frame 11 which is of generally circular configuration. The frame 11 as illustrated has one half 15 of a hinge 16 secured thereto in conventional manner, and which can be by epoxy cement of well known type, or by other fastening means to the material forming the frame 11. The hinge half 15 includes a flat base plate 17, which is engaged with the frame 11, and has a barrel like member 18 extending therefrom with a hinge plate 19 spaced downwardly from member 18, and extending from plate 17. A temple 20 of conventional type is also shown, with a hinge half 21, which includes a rectangular plate 22 engaged therewith as described for plate 17. A tongue 23 extends perpendicularly from plate 22 and between member 18 and plate 19. The member 18 has a vertical passageway 25 therein, which includes an inner threaded bore 26, an upper opening 27 of reduced diameter, and a lower opening 28 of still greater reduced diameter.

A screw 30 is illustrated in passageway 25 of hinge half 15, which screw has a head 31 of greater diameter than opening 27, and a rim 32 which is engaged in threaded bore 26. A shaft 33 extends down from head 31, with a lower threaded portion 34, which can pass through opening 28, but the screw 30 can not be readily removed from member 18.

The head 31 has a slot 35 therein which can be engaged by a screwdriver (not shown) to be described. It should be noted that while only one temple is illustrated, another temple of opposite hand would be used on the other side of the lens frame 11.

The mode of operation will now be pointed out.

When it is desired to assemble the temple 20 to frame 10 the tongue 23 is inserted between the member 18 and plate 19. Screwdriver (not shown) is rotated to turn the rim 32 down in bore 26. The tongue 23 has an opening 36 through which the lower threaded portion 34 and the shaft 33 can pass with the portion 34 engaging a threaded opening 40 in plate 19. The screw 30 is further tightened as desired which then serves to retain the hinge 16 together. The screw 30 can be loosened as required and tongue 23 removed without the screw 30 coming out.

It will thus be apparent that structure has been provided with which the objects of the invention are achieved.

I claim:

1. Hinge construction for an eyeglass frame which includes a lens frame and two temples, wherein a hinge is provided for each temple to rotatably retain the temples to the frame, the improvement which comprises a flat base plate secured to said lens frame,
a barrel like member extending from said base plate,
a hinge plate also extending from said base plate and spaced downwardly from said barrel like member, a rectangular plate fastened to said temple,
a tongue extending from said rectangular plate and between said hinge plate and said barrel like member,
a cylindrical passageway in said barrel like member,
a threaded bore in said passageway,
said passageway having an upper opening of lesser diameter than said bore,
said passageway having a lower opening of lesser diameter than said upper opening,
screw means in said passageway,
said screw means including a head located in said bore and having a larger diameter than said upper opening,
a rim on said head engaged in said threaded bore,
a shaft extending from said head down through said lower opening,
said tongue having an opening to permit the shaft to pass therethrough,
a threaded opening in said hinge plate,
a threaded portion on said shaft to engage said hinge plate opening, and
to thereby retain said hinge together.

* * * * *